United States Patent
Terada et al.

(10) Patent No.: US 6,846,894 B2
(45) Date of Patent: Jan. 25, 2005

(54) LAMINATE ADHESIVE AND USAGE THEREOF

(75) Inventors: Hideki Terada, Osaka (JP); Shigetoshi Sasano, Osaka (JP); Sachio Igarashi, Osaka (JP)

(73) Assignee: Mitsui Takeda Chemicals, Inc., Tokyo (JP)

( * ) Notice: Subject to any disclaimer, the term of this patent is extended or adjusted under 35 U.S.C. 154(b) by 241 days.

(21) Appl. No.: 10/199,030

(22) Filed: Jul. 22, 2002

(65) Prior Publication Data

US 2003/0096110 A1 May 22, 2003

(30) Foreign Application Priority Data

Jul. 31, 2001 (JP) ........................................ 2001-230797

(51) Int. Cl.$^7$ .............................................. C08G 18/77
(52) U.S. Cl. ............................ 528/28; 528/49; 528/65; 524/710; 156/331.4
(58) Field of Search ......................... 156/331.4; 528/49, 528/28, 65; 524/710

(56) References Cited

U.S. PATENT DOCUMENTS 5,096,980 A      3/1992  Yamazaki et al. .......... 525/438
6,649,084 B2 *  11/2003  Morikawa et al. ..... 252/182.22

FOREIGN PATENT DOCUMENTS

| CA | 1096094  | 2/1981  |
|----|----------|---------|
| EP | 0 084 364 | 7/1983  |
| EP | 0 096 249 | 12/1983 |
| EP | 0 349 838 | 1/1990  |

OTHER PUBLICATIONS

Patent Abstracts of Japan, No. 9, Oct. 13, 2000 & JP 2000–154362 A, Jun. 6, 2000 *abstract*.

* cited by examiner

Primary Examiner—Rachel Gorr
(74) Attorney, Agent, or Firm—Wenderoth, Lind & Ponack, L.L.P.

(57) ABSTRACT

To provide a laminate adhesive that can keep on having adequate adhesiveness and also can prevent the odor and taste of the inherent properties of the content packed by the packing product from being spoiled even after high temperature sterilization treatment, such as the hot-water spray sterilization treatment, the hot-water rotary sterilization treatment or the steam sterilization treatment, to provide a usage of the laminate adhesive, the laminate adhesive comprises a curing component containing polyisocyanate and a base component containing polyol, wherein a silane coupling agent is contained in at least the curing component. Preferably, the silane coupling agent is mixed with both of the curing component and the base component. Further preferably, epoxysilane is mixed with the curing component and also aminosilane and oxyacid of phosphorus or derivative thereof are mixed with the base component.

7 Claims, No Drawings

LAMINATE ADHESIVE AND USAGE THEREOF

BACKGROUND OF THE INVENTION

1. Technical Field

The present invention relates to a laminate adhesive and, more particularly, to a laminate adhesive that is useful for the manufacture of packaging materials for use in a variety of industrial fields, including packaging materials for food products, beverages, medical products and quasi-drugs and to a usage thereof.

2. Description of the Prior Art

Composite films produced by laminating plastic films, metal foils, such as aluminum foils, metallized films and silica evaporated films by the application of an adhesive have been widely used as packaging materials for use in a variety of industrial fields, including packaging materials for food products, beverages, medical products and quasi-drugs, up to the present date.

The so-called two-component urethane adhesive, using a curing component containing polyisocyanate in combination with a base component containing polyol, such as polyester polyol, is used most as the laminate adhesive for use in the manufacture of these packaging materials, because of its excellent adhesion properties.

This two-component urethane adhesive is known, for example, from JP Patent Publication No. Sho 58(1983)-11912 which proposes that a silane coupling agent is mixed with the urethane adhesive in order to enhance an adhesive strength between the plastic film and the metal foil. Indeed, the mixing of the silane coupling agent with the base component is practically in wide use.

In recent years, from the aspect of hygienic importance, the sterilization treatment that the packaging products made from those composite films go through a high-temperature sterilization treatment, such as a hot-water spray sterilization treatment, a hot-water rotary sterilization treatment or a steam sterilization treatment is being widely carried out. After the high-temperature sterilization treatment, however, the composite film may have the problem that the plastic film and the metal foil of the composite film are delaminated.

It is conceivable that a quantity of silane coupling agent mixed is increased, in order to prevent this delamination, but the increase of the quantity of siliane coupling agent mixed may cause the problem that the odor and taste of the inherent properties of the content packed by the packaging product are spoiled.

SUMMARY OF THE INVENTION

It is the object of the present invention to provide a laminate adhesive that can keep on having adequate adhesiveness and also can prevent the odor and taste of the inherent properties of the content packed by the packaging product from being spoiled even after high temperature sterilization treatment such as the hot-water spray sterilization treatment, the hot-water rotary sterilization treatment or the steam sterilization treatment, and to provide a usage of the laminate adhesive.

The present invention provides a laminate adhesive comprising a curing component containing polyisocyanate and a base component containing polyol, wherein a silane coupling agent is further contained in at least the curing component.

Preferably, the silane coupling agent is further contained in the base component.

Preferably, the silane coupling agent is epoxysilane.

It is preferable that aminosilane is further contained in the base component.

Also, it is preferable that oxyacid of phosphorus or derivative thereof is further contained in the base component.

The laminate adhesive of the present invention is suitably applied for purposes and applications subjected to hot-water treatments at a temperature of not less than 100° C.

In addition, the present invention provides a usage of a laminate adhesive wherein a curing component containing polyisocyanate and silane coupling agent and a base component containing polyol are prepared for a laminate adhesive, and after the curing component and the base component are mixed, the mixture is applied to an object to be adhesive bonded.

The laminate adhesive of the present invention and the usage thereof can provide the advantages that even after high-temperature sterilization treatment, such as the hot-water spray sterilization treatment, the hot-water rotary sterilization treatment and the steam sterilization treatment, at a temperature of not less than 100° C., the laminate adhesive keeps its good adhesiveness, without spoiling the odor and taste of the inherent properties of the content packed by the packaging product, and also have adequate adhesiveness for lamination, heat-and-humidity resistance and aptitude for high-temperature sterilization, so that it can be suitably used for the laminate adhesives used for the manufacture of packaging materials for use in a variety of industrial fields, including packaging materials for food products, beverages, medical products and quasi-drugs.

DESCRIPTION OF THE PREFERRED EMBODIMENTS

The laminate adhesive of the present invention is prepared as the so-called two component urethane adhesive comprising a curing component and a base component.

The curing component used in the present invention contains polyisocyanate and silane coupling agent.

Polyisocyanates having a number of functional groups of 2–4 may preferably be used in the present invention, though not limitative.

To be more specific, the polyisocyanates which may be used include polyisocyanate monomers and derivatives thereof. The polyisocyanate monomers which may be used include, for example, aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate and 2,6-diisocyanatomethyl caproate; alicyclic diisocyanates, such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis(cyclohexylisocyanate), methyl 2,4-cyclohexane diisocyanate, methyl 2,6-cyclohexane diisocyanate and 1,4- or 1,3-bis(isocyanatomethyl)cyclohexane; aromatic diisocyanates such as m-phenylene diisocyanate, p-phenylene diisocyanate, 4,4'-diphenyl diisocyanate, 1,5-naphthalene diisocyanate, 4,4'- or 2,4'-diphenylmethane diisocyanate or mixture thereof, 2,4- or 2-6-tolylene diisocyanate or mixture thereof, 4,4'-toluidine diisocyanate, dianisidine diisocyanate and 4,4'-diphenyl ether diisocyanate; aralkyl diisocyanates, such as 1,3- or 1,4-xylylene diisocyanate or mixture thereof, ω,ω-diisocyanate-1,4- diethylbenzene and 1,3- or 1,4-bis(1-isocyanato-1-methylethyl)benzene or mixture thereof; triisocyanates such as triphenylmethane-4,4',4"-triisocyanate, 1,3,5-triisocyanatobenzene and 2,4,6-triisocyanatotoluene; and tetraisocyanates such as 4,4'-diphenyldimethylmethane-2,2'-5,5'-tetraisocyanate. The polyisocyanate derivatives which may be used include, for example, dimers, trimers, biurets, allophanates, polyisocyanates having a 2,4,6-oxadiazinetrione ring obtained from carbon dioxide and the above polyisocyanate monomers; or adducts formed with low-molecular-weight polyols having a molecular weight of less than 200, such as ethylene glycol, propylene glycol, butylene glycol, hexylene glycol, neopentyl glycol, 1,6-hexane glycol, 3-methyl-1,5-pentanediol, 3,3'-dimethylolheptane, cyclohexanedimethanol, diethylene glycol, triethylene glycol, dipropylene glycol, glycerol, trimethylolpropane, pentaerythritol and sorbitol; or polyisocyanate adducts having a molecular weight of 200–200,000, such as polyester polyol, polyether polyol, polyester amide polyol, acrylic polyol, polyhydroxyalkane and natural oil polyol.

These polyisocyanates may be used singly or in combination of two or more. Preferably, hexamethylene diisocyanate, 3-isocyanatomethyl-3,5,5-trimethylcyclohexyl isocyanate, 4,4'-methylenebis(cyclohexylisocyanate), 1,4- or 1,3-bis-(isocyanatomethyl)cyclohexane, 1,3- or 1,4-xylylne diisocyanate or mixture thereof, and polyisocyanate derivatives thereof can be cited.

The silane coupling agents that may be used in the present invention include any compounds having structural formula of R—Si≡(X)$_3$ or R—Si≡(R')(X)$_2$ (wherein R represents an organic group having a vinyl, epoxy, amino, imino, isocyanate or mercapto group; R' represents a lower alkyl group; and X represents a methoxy or ethoxy group, or a chlorine atom). For example, chlorosilanes, such as vinyltrichlorosilane, aminosilanes, such as N-β-(aminoethyl)-γ-aminopropyltrimethoxysilane, γ-aminopropyltriethoxysilane, N-β-(aminoethyl)-γ-propylmethyl dimethoxysilane, n-(dimethoxymethylsilylpropyl)ethylenediamine, n-(triethoxysilylpropyl)ethylenediamine and N-phenyl-γ-aminopropyltrimethoxysilane; epoxysilanes, such as γ-glycidoxypropyltrimethoxysilane, γ-glycidoxypropyltriethoxysilane, β-(3,4-epoxycyclohexyl)ethyltrimethoxysilane and di(γ-glycidoxypropyl)dimethoxysilane; vinyl silanes, such as vinyltriethoxysilane; and isocyanate silanes, such as 3-isocyanatepropyltrimethoxysilane and 3-isocyanatepropyltriethoxysilane can be cited. These silane coupling agents may be used singly or in combination of two or more.

The mixing of the silane coupling agent with the curing component can provide improved hot-water resistant of the laminate adhesive to ensure adequate adhesiveness even after high-temperature sterilization treatment, without spoiling the odor and taste of the content packed by a packaging product laminated by the application of the laminate adhesive of the present invention.

In the present invention, it is preferable that epoxysilane is mixed with the curing component. The mixing of the epoxysilane with the curing component can provide further improved adhesiveness.

The quantity of silane coupling agent mixed with the curing component is, for example, in the range of 0.1–25.0 parts by weight, or preferably 0.5–20.0 parts by weight, per 100 parts by weight of polyisocyanate. When the quantity of silane coupling agent mixed is less than 0.1 parts by weight, there is the possibility that the delamination between the films laminated through the application of the laminate adhesive of the present invention may be incurred in the sterilization treatment and the like, though it depends on the polyisocyanate composition. On the other hand, when the quantity of silane coupling agent mixed is more than 25.0 parts by weight, there are provided increased possibilities that the storage stability of the curing component may be reduced.

The curing component can be produced, for example, by mixing the silane coupling agent with the polyisocyanate mentioned above and diluting that mixture with an organic solvent.

The organic solvents that may be used in the present invention include, for example, esters solvents, such as ethyl acetate and butyl acetate, ketonic solvents, such as methylethyl ketone and methylisobutyl ketone, and aromatic solvents, such as toluene and xylene. The quantity of organic solvent mixed is properly selected in accordance with its intended purpose and application.

For example, if the polyisocyanate comes to have a viscosity of about 100 to about 10,000 mPa·s, or preferably about 100 to about 5,000 mPa·s, in a temperature range from ordinary temperature to 100° C. when mixed with base component mentioned later, then the polyisocyanate mixed with the silane coupling agent can be used as the curing component as it is, without being diluted with the organic solvent.

The base component used in the present invention includes polyols. The polyols having a number of functional groups of 2–6, or preferably 2–4, a number-average molecular weight of 200–200,000, preferably 300–100,000, or further preferably 300–50,000 and a acid value of 0–280 mgKOH/g, preferably 0–100 mgKOH/g, or further preferably 0–50 mgKOH/g may preferably be used in the present invention, though not limitative.

To be more specific, for example, polyester polyol, polyether polyol, polyester amide polyol, acrylic polyol, polyhydroxyalkane, natural oil polyol and polyurethane polyol, or mixtures thereof can be cited.

The polyester polyols that may be used include polyester polyols obtained by esterification reaction of dibasic acids, such as terephthalic acid, isophthalic acid, adipic acid, azelaic acid and sebacic acid, dialkyl esters thereof, or mixtures thereof with glycols, such as ethylene glycol, prolylene glycol, diethylene glycol, butylene glycol, neopentyl glycol, 1,6-hexane glycol, 3-methyl-1,5-pentanediol, 3,3'-dimethylolheptane, polyethylene glycol, polypropylene glycol and polytetramethylene ether glycol or mixtures thereof, or polyester polyols, such as polycaprolactone, polybarerolactone and poly(β-methyl-γ-barerolactone).

Further, the polyester polyols obtained by the esterification reaction include those acidified by polybasic acids, or anhydrides thereof such as trimellitic anhydride.

The polyether polyols that may be used include, for example, polyether polyols obtained by polymerization of oxirane compounds, such as ethylene oxide, propylene oxide, butylene oxide and tetrahydrofuran by using low molecular weight polyols, such as water, ethylene glycol, propylene glycol, trimethylolpropane and glycerin, as initiator.

The polyester amide polyols that may be used include, for example, polyester amide polyols obtained with low molecular weight polyamines, such as ethylene diamine, propylene diamine and hexamethylene diamine, used in combination as raw material in the esterification reaction of the polyester polyols.

The acrylic polyols that may be used include, for example, acrylic polyols obtained by copolymerization of polymerizable monomers having not less than one hydroxyl group in one molecule, such as hydroxyethyl acrylate, hydroxypropyl acrylate and hydroxybutyl acrylate, or their corresponding methacrylic acid derivatives, with acrylic acid, methacrylic acid or their esters.

The polyhydroxyalkanes that may be used include, for example, liquid rubbers obtained by polymerization with butadiene or by copolymerization with butadiene, acrylamide, etc.

The natural oil polyols that may be used include, for example, castor oil and cocoanut oil.

The polyurethane polyols that may be used include, for example, polyols having a urethane linkage in one molecule obtained, for example, by allowing polyester polyol, polyether polyol, etc. having a number average molecular weight of 200–5,000 to react with the polyisocyanate cited above in an equivalent ratio of the isocyanate group to the hydroxyl group (NCO/OH) of less than 1, or preferably not more than 0.8.

Further, in addition to the polyols cited above, the polyol of low-molecular-weight polyols having a molecular weight of 62–200 may be mixed for the purpose of adjusting the number average molecular weight of polyols. Those low-molecular-weight polyols include, for example, glycols generally used in the manufacturing of polyester polyols, such as ethylene glycol, propylene glycol, butylene glycol, diethylene glycol, dipropylene glycol, hexylene glycol, neopentyl glycol and cyclohexanedimethanol, and at least trifunctional polyols, such as glycerin, trimethylolpropane and pentaerythritol.

These polyols may be used singly or in combination of two or more. Polyester polyol, polyether polyol and polyurethane polyol are preferably used.

In the present invention, the silane coupling agent can be mixed with the base component within the limits of having little influence on the odor and taste of the packed content, in addition to the silane coupling agent being mixed with the curing component. The silane coupling agent mixed with the base component as well as that mixed with the curing component (i.e., the silane coupling agent added to both of the curing component and the base component) can provide further improved hot-water resistance to ensure adequate adhesiveness even after high-temperature sterilization treatment.

The silane coupling agents to be mixed with the base component include the same silane coupling agents as those to be mixed with the curing component. Those silane coupling agents may be used singly or in combination of two or more.

In the present invention, the epoxy silane may be mixed with the base component, as is the case with that mixed with the curing component. Alternatively or additionally, aminosilane may be mixed therewith. In other words, in the present invention, for example, the epoxy silane and/or the aminosilane may be mixed with the base component.

The mixing of the epoxy silane with base component can provide improved adhesiveness. The mixing of the aminosilane with the base component can provide improved adhesiveness when oxyacid of phosphorus or derivative thereof is mixed with the base component, as will be mentioned later.

The quantity of silane coupling agent mixed with the base component is, for example, in the range of 0.1–2.0 parts by weight, or preferably 0.1–1.5 parts by weight, per 100 parts by weight of polyol. When the quantity of silane coupling agent mixed is less than 0.1 parts by weight, there is the possibility that the delamination between the films laminated by the application of the laminate adhesive of the present invention may be incurred in the sterilization treatment and the like, though it depends on the polyol composition. On the other hand, when the quantity of silane coupling agent mixed is more than 2.0 parts by weight, there are provided increased possibilities that the odor and taste of the packed content may be spoiled.

Further, in the present invention, it is preferable that an oxyacid of phosphorus or its derivative is mixed with the base component. The mixing of the oxyacid of phosphorus or its derivative with the base component can provide improved acid resistance.

The oxyacids of phosphorus or derivatives thereof that may be used in the present invention are as follows. The oxyacids of phosphorus that may be used include, for example, phosphoric acids, such as hypophosphorus acid, phosphorous acid, orthophosphoric acid and hypophosphoric acid, condensed phosphoric acids, such as metaphosphoric acid, pyrophosphoric acid, tripolyphosphoric acid, polyphosphoric acid and ultraphosphoric acid.

The derivatives of the oxyacids of phosphorus that may be used include, for example, salts such as sodium salts and potassium salts, of phosphoric acids or condensed phosphoric acids, monoesters, such as monomethyl orthophosphate, monoethyl orthophosphate, monopropyl orthophosphate, monobutyl orthophosphate, mono-2-ethylhexyl orthophosphate, monophenyl orthophosphate, monomethyl phosphite, monoethyl phosphite, monopropyl phosphite, monobutyl phosphite, mono-2-ethylhexyl phosphite and monophenyl phosphite, di- and triesters, such as di-2-ethylhexyl orthophosphate, diphenyl orthophosphate, trimetyl orthophosphate, trietyl orthophosphate, triprophyl orthophosphate, tributyl orthophosphate, tri-2-ethylhexyl orthophosphate, triphenyl orthophosphate, dimethyl phosphite, diethyl phosphite, dipropyl phosphite, dibutyl phosphite, di-2-ethylhexyl phosphate, diphenyl phosphite, trimethyl phosphite, triethyl phosphite, tripropyl phosphite, tributyl phosphite, tri-2-ethylhexyl phosphite and triphenyl phosphite, and mono-, di- and triesters obtained from condensed phosphoric acids and alcohols.

These oxyacids of phosphorus or their derivatives may be use singly or in combination of two or more. Among others, those having not less than one free oxyacid are preferable. For example, orthophosphoric acids or polyphosphoric acids are preferable.

The quantity of oxyacid of phosphorus or its derivative thereof is, for example, in the range of 0.01–1.0 parts by weight, or preferably 0.1–0.5 parts by weight, per 100 parts by weight of polyol. When the quantity of oxyacid of phosphorus mixed is less than 0.01 parts by weight, there is the possibility that adequate acid resistance may not be obtained. On the other hand, when the quantity of oxyacid of phosphorus mixed is more than 1.0 parts by weight, there is the possibility that the adhesiveness may be reduced.

When the aminosilane as well as the oxyacid of phosphorus or its derivative are mixed with the base component, the aminosilane is preferably mixed, for example, two to ten times as much as the oxyacid of phosphorus or its derivative on a weight basis.

The base component can be produced, for example, by the polyol cited above or the polyol mixed with the silane coupling agent and/or the oxyacid of phosphorus or its derivative, if necessary, being diluted with the organic solvent. The organic solvents that may be used herein include the same organic solvents as those mentioned above.

For example, if the polyol comes to have a viscosity of about 100 to about 10,000 mPa·s, or preferably about 100 to about 5,000 mPa·s, in a temperature range of ordinary temperature to 100° C. when mixed with the curing component mentioned above, then the polyol mixed with the curing component and, if necessary, the silane coupling agent and/or the oxyacid of phosphorus or its derivative can be used as the base component as it is, without being diluted with the organic solvent.

The quantity of the silane coupling agent is preferably so prepared as to be in the range of 0.1–5.0 wt %, or preferably 0.5–3.0 wt %, to the total laminate adhesive composition: When the quantity of silane coupling agent mixed is less than 0.1 wt %, there is the possibility that the delamination between the films laminated by the application of the laminate adhesive of the present invention may be incurred in the sterilization treatment and the like, though it depends on the adhesive composition. On the other hand, when the quantity of silane coupling agent mixed is more than 5.0 wt %, there are provided increased possibilities that the odor and taste of the packed content may be spoiled.

In addition, known additives, such as epoxy resins, catalysts, carboxylic acids or anhydrates thereof, antioxidants, ultraviolet absorbers, hydrolysis stabilizers, antifungal or antibacterial agents, thickening agents, plasticizers, pigments and fillers, may be mixed with the laminate adhesive within the limits of not hindering the properties of the laminate adhesive of the present invention.

These additives may be mixed with the curing component and/or the base component. The additives are usually mixed with the base component, though the determination can be selectively made in accordance with the intended purposes and applications.

The laminate adhesive of the present invention using the curing component and the base component in combination is used in the form of the two-component urethane adhesive. In use of the laminate adhesive of the present invention, the curing component and the base component, that are separately prepared beforehand for use, are combined with each other when applied to the object to be adhesive bonded. The curing component and the base component are preferably mixed in the range of 0.4–10, or preferably 0.5–2.0, in the equivalent ratio (NCO/OH) of the isocyanate group in the curing component to the active hydrogen group (hydroxyl group and amino group) in the base component.

This two-compound urethane adhesive, in which the curing component and the base component are separately prepared beforehand, can provide an extended pot life and also can afford the effective use for the adhesive having adequate fast-cure and adhesion performances by using only a necessary minimum amount of curing component and base component.

To be more specific, the laminate adhesive of the present invention is used as the adhesive used mainly for producing a composite film in the laminating process. For example, when the curing component and base component diluted with the organic solvent are used, the curing component and the base component are mixed, first, and, then, that mixture is applied to a surface of each film by means of a solvent type laminator. Then, after the solvent is evaporated, the surfaces of the films to which the mixture was applied are joined and are cured at ordinary temperature or under heating. The quantity of the adhesive composition applied to the film is preferably in the range of about 2.0 to about 5.0 g/m² after evaporation of the solvent.

On the other hand, when the curing component and base component which are not diluted with the organic solvent are used, the curing component and the base component are mixed, first, and, then, that mixture is applied to a surface of each film by means of a solvent-free type laminator. Thereafter, the surfaces of the films to which the mixture was applied are joined and are cured at ordinary temperature or under heating. The quantity of the adhesive composition applied to the film is preferably in the range of about 1.0 to about 3.0 g/m².

The films laminated as the object to be adhesive bonded include, for example, films of plastics, such as polyethylene terephthalate, nylon, polyethylene, polypropylene and polyvinyl chloride, metal foils such as aluminum foil, metallized films, silica evaporated films, and metallic films of e.g. stainless steel, iron, copper and lead. Take the plastic films for instance, they preferably have thickness of 5–200 μm.

The laminate adhesive of the present invention can provide the advantages that when the composite film produced by the application of the laminate adhesive of the present invention is subjected to the high-temperature sterilization treatment, such as the hot-water spray sterilization treatment, the hot-water rotary sterilization treatment or the steam sterilization treatment, at a temperature of not less than 100° C., the composite film is substantially free from the delamination between the films and also is capable of preventing the odor and taste of the packed contents from being spoiled. Thus, the laminate adhesive of the present invention has improved adhesiveness for lamination, heat-and-humidity resistance and aptitude for high-temperature sterilization, so that it can be suitably used for the laminate adhesives used for the manufacture of packaging materials for use in a variety of industrial fields, including packaging materials for food products, beverages, medical products and quasi-drugs.

EXAMPLES

While the present invention will be described in further detail with reference to the following examples, the present invention is not limited to those examples. The terms, "parts" and "%", presented in the examples and the comparative examples are all on a weight basis, unless otherwise specified therein.

Manufacturing Example 1

Manufacture of Polyisocyanate A 50 g of TAKENATE A-10 (trimethylolpropane adduct of xylenediisocyanate, available from Mitsui Takeda Chemicals, Inc.) and 50g of TAKENATE A-40 (trimethylolpropane adduct of 3-isocyanatomethyl-3,5,5-trimethylcyclohexyl isocyanate, available from Mitsui Takeda Chemicals, Inc.) were uniformly mixed at 50° C. in an atmosphere of nitrogen, to obtain Polyisocyanate A having an isocyanate group content of about 11%.

Manufacturing Example 2

Manufacture of Polyisocyanate B 75 g of trimer of 3-isocyanatomethyl-3,5,5-trimethylcyclohexyl isocyanate having an isocyanate group content of 17.3% (VESTANATE T1890/100 (brand name) available from Huls Corporation) was dissolved in 25 g of ethyl acetate, to obtain Polyisocyanate B in the form of solution having a solid content of 75%.

Manufacturing Example 3

Manufacture of Polyol A 529.4 g of isophthalic acid, 128.8 g of ethylene glycol and 302.4 g of neopentyl glycol were subjected to esterification reaction at 180–220° C. in a stream of nitrogen. After a prescribed amount of water was distilled, 214.8 g of sebacic acid was added thereto and the reaction product was further subjected to esterification reaction at 180–220° C., to obtain polyester polyol having the number average molecular weight of about 3,000. The total amount of the polyester polyol thus obtained was dissolved in 428.6 g of ethyl acetate, to produce the solution having a solid content of 70%.

Sequentially, 33.70 g of 3-isocyanatomethyl-3,5,5-trimethylcyclohexyl isocyanate was added to 473.60 g of the polyester polyol thus produced. Then, that polyester polyol was subjected to urethane reaction at 77–80° C. for three hours. Then, after 0.25 g of tin octylate was added thereto, the reaction product was further subjected to the urethane reaction for three hours and then was cooled down to 70° C. Then, 223.39 g of ethyl acetate was added to thereby produce Polyol A in the form of solution having a solid content of 50%. The polyurethane polyol of Polyol A thus produced had the number average molecular weight of about 10,000.

Manufacturing Example 4

Manufacture of Polyol B 324.88 g of isophthalic acid, 106.16 g of ethylene glycol, 102.61 g of neopentyl glycol, 151.34 g of 1,6-hexanediol and 0.20 g of zinc acetate were subjected to esterification reaction at 180–220° C. in a stream of nitrogen. After a prescribed amount of water was distilled, 95.24 g of adipic acid was added, for further esterification reaction at 180–220° C. Thereafter, the reaction system was gradually depressurized, so that the reaction product was subjected to condensation reaction at 220–230° C. for four hours, to obtain polyester polyol having the number average molecular weight of about 5,500. The total amount of the polyester polyol thus obtained was dissolved in 600.00 g of ethyl acetate, to produce Polyol B in the form of solution having a solid content of 50%.

Manufacturing Example 5

Manufacture of Polyol C

In the manufacturing Example 2, after the polyester polyol having the number average molecular weight of about 5,500 was obtained, 9.60 g of trimellitic anhydride was added to the polyester polyol, followed by the reaction (acidifying reaction) at 140–150° C. Thereafter, 609.60 g of ethyl acetate was added to produce Polyol C in the form of solution having a solid content of 50%. The polyester polyol of Polyol C thus produced had the number average molecular weight of about 5,500.

Preparation of Curing Component

Following curing components were prepared.

Curing component A-0: the curing component using Polyisocyanate A intact was prepared as the curing component A-0.

Curing component A-1: 10 parts of Polyisocyanate A and 1.0 parts of silane coupling agent A (γ-glycidoxypropyltrimethoxysilane, KBM-403 (brand name) available from Shin-Etsu Chemical Co., Ltd.)(this abbreviation is also used in the following) were mixed to prepare the curing component A-1.

Curing component A-2: 10 parts of Polyisocyanate A and 2.0 parts of silane coupling agent A were mixed to prepare the curing component A-2.

Curing component B-0: the curing component using Polyisocyanate B intact was prepared as the curing component B-0.

Curing component B-1: 10 parts of Polyisocyanate B and 1.0 parts of silane coupling agent A were mixed to prepare the curing component B-1.

Preparation of Base Component

Following base components were prepared.

Base component A-0: the base component using Polyol A intact was prepared as the base component A-0.

Base component A-1: 100 parts of Polyol A and 1.0 parts of silane coupling agent A were mixed to prepare the base component A-1.

Base component A-2: 100 parts of Polyol A, 0.2 parts of oxyacid of phosphorus (85% orthophosphoric acid, available from Wako Pure Chemical Industries, Ltd.)(this abbreviation is also used in the following) and 0.4 parts of silane coupling agent (N-β-(aminoethyl)-γ-aminopropyltrimethoxysilane, KBM-603 (brand name) available from Shin-Etsu Chemical Co., Ltd.)(this abbreviation is also used in the following) were mixed to prepare the base component A-2.

Base component B-0: the base component using Polyol B intact was prepared as the base component B-0.

Base component B-1: 100 parts of Polyol B and 1.0 parts of silane coupling agent A were mixed to prepare the base component B-1.

Base component B-2: 100 parts of Polyol B, 0.2 parts of oxyacid of phosphorus and 0.4 parts of silane coupling agent B were mixed to prepare the base component B-2.

Base component C-0: 50 parts of polyol A and 50 parts of polyol C were mixed to prepare the base component C-0.

Base component C-1: 50 parts of Polyol A, 50 parts of Polyol C and 1.0 parts of silane coupling agent A were mixed to prepare the base component C-1.

Base component C-2: 50 parts of Polyol A, 50 parts of Polyol C and 0.2 parts of oxyacid of phosphorus were mixed to prepare the base component C-2.

Base component C-3: 50 parts of Polyol A, 50 parts of Polyol C, 0.2 parts of oxyacid of phosphorus and 0.4 parts of silane coupling agent B were mixed to prepare the base component C-3.

Base component C-4: 50 parts of Polyol A, 50 parts of Polyol C and 0.4 parts of silane coupling agent B were mixed to prepare the base component C-4.

Base component C-5: 50 parts of Polyol A, 50 parts of Polyol C, 0.2 parts of oxyacid of phosphorus, 1.0 parts of silane coupling agent A and 0.4 parts of silane coupling agent B were mixed to prepare the base component C-5.

Base component C-6: 50 parts of Polyol A, 50 parts of Polyol C and 2.0 parts of silane coupling agent A were mixed to prepare the base component C-6.

Preparation of and Evaluation of Examples and Comparative Examples

The curing components and base components thus prepared were combined as cited in TABLE 1 to prepare the laminate adhesives of Examples 1–12 and Comparative Examples 1–5. Subsequently, after those curing components and base components of the laminate adhesives of the respective Examples and Comparative Examples were mixed, the mixtures were used to produce composite films in the manner mentioned later. Thereafter, the hot-water resistance tests and gustation tests of the respective composite films were conducted. The results are shown in TABLE 2.

Production of Composite Film

Four-layered composite films, each comprising a polyethylene terephthalate film (12 μm in thickness)/a nylon film (25 μm in thickness)/an aluminum foil (7 μm in thickness)/an unextended polypropylene film (70 μm in thickness, one side is subjected to corona discharge treatment), were produced by the application of the laminate adhesives of Examples and Comparative Examples.

The laminate adhesives (wherein the curing component and the base component were mixed) of Examples and Comparative Examples cited in TABLE 1 were each applied to one side of the polyethylene terephthalate film with the laminator under ordinary temperature, first, and then, after the solvent was evaporated, the one side of the polyethylene terephthalate film was bonded to the nylon film. Subsequently, the laminate adhesives of Examples and Comparative Examples were each applied to the other side of the nylon film of the two-layer composite film in the same manner as the above and, then, after the solvent was evaporated, the other side of the nylon film was bonded to one side of the aluminum foil. Subsequently, the laminate adhesives of Examples and Comparative Examples were each applied to the other side of the aluminum foil of the three-layer composite film in the same manner as the above and, then, after the solvent was evaporated, the other side of the aluminum foil was bonded to the corona-treated side of the unextended polypropylene film. Thereafter, those four-layer composite films were cured at 50° C. for three days, for the curing of the laminate adhesives.

Hot-Water Resistance Tests (Rotary Steam Sterilization Retort Tests)

Bags of the size of 9×14 cm were made from the composite films thus produced and distilled water was filled in the bags as the contents. The bags were put on trays of the size of 210×520×105 mm revolving at 8 revolutions per minute and were sterilized by steam at 130° C. for 30 minutes under the pressure of 0.30 MPa. Thereafter, observation was made on the presence of the delamination between the films at the corners of the bags. Those specimens were tested five bags for each type.

Gustation Test

Bags of the size of 13×17 cm were made from the composite films thus produced and distilled water was filled in the bags as the contents. The bags were sterilized by hot water at 135° C. for 20 minutes under the pressure of 0.35 MPa. Thereafter, the comparative sensory tests before and after sterilization were conducted.

TABLE 2

| Examples and Comparative Examples | | Hot-water resistance test | Gustation Test |
|---|---|---|---|
| Examples | 1 | Δ | ○ |
| | 2 | ○ | ○ |
| | 3 | Δ | ○ |
| | 4 | ○ | ○ |
| | 5 | Δ | ○ |
| | 6 | ○ | ○ |
| | 7 | ○ | ○ |
| | 8 | ○ | ○ |
| | 9 | ⊙ | ○ |
| | 10 | ○ | ○ |
| | 11 | ⊙ | Δ |
| | 12 | ⊙ | Δ |
| Comparative Examples | 1 | X | Δ |
| | 2 | X | Δ |
| | 3 | X | Δ |
| | 4 | X | Δ |
| | 5 | Δ | X |

Hot-water resistance test
⊙: No delamination
○: Delamination of less than 1 mm
Δ: Delamination in the range of not less than 1 mm to less than 3 mm
X: Delamination of more than 3 mm
Gustation Test
○: No change of odor and taste
Δ: Some change of odor and taste
X: Unusual odor and taste While the illustrative examples of the present invention are provided in the description above, such is for illustrative purpose only and it is not to be construed restrictively. Modification and variation of the present invention that will be obvious to those skilled in the art is to be covered in the following claims.

What is claimed is:

1. A laminate adhesive comprising a curing component containing polyisocyanate and a base component containing polyol,
wherein epoxy silane as a silane coupling agent is contained in at least the curing component.

TABLE 1

| Examples and Comparative Examples | | Curing component | | | | Base component | | | | | |
|---|---|---|---|---|---|---|---|---|---|---|---|
| | | Polyisocyanate (parts by weight) | | Coupling agent (parts by weight) A | Polyol (parts by weight) | | | | Coupling agent (parts by weight) | | Oxyacids of phosphorus (parts by weight) |
| | Type | A | B | (Epoxysilane) | Type | A | B | C | A (Epoxysilane) | B (Aminosilane) | |
| Examples | 1 | A-1 | 10.0 | — | 1.0 | A-0 | 100.0 | — | — | — | — | — |
| | 2 | A-1 | 10.0 | — | 1.0 | A-2 | 100.0 | — | — | — | 0.4 | 0.2 |
| | 3 | B-1 | — | 10.0 | 1.0 | B-0 | — | 100.0 | — | — | — | — |
| | 4 | B-1 | — | 10.0 | 1.0 | B-2 | — | 100.0 | — | — | 0.4 | 0.2 |
| | 5 | A-1 | 10.0 | — | 1.0 | C-0 | 50.0 | — | 50.0 | — | — | — |
| | 6 | A-1 | 10.0 | — | 1.0 | C-3 | 50.0 | — | 50.0 | — | 0.4 | 0.2 |
| | 7 | A-2 | 10.0 | — | 2.0 | C-0 | 50.0 | — | 50.0 | — | — | — |
| | 8 | A-2 | 10.0 | — | 2.0 | C-2 | 50.0 | — | 50.0 | — | — | 0.2 |
| | 9 | A-2 | 10.0 | — | 2.0 | C-3 | 50.0 | — | 50.0 | — | 0.4 | 0.2 |
| | 10 | A-2 | 10.0 | — | 2.0 | C-4 | 50.0 | — | 50.0 | — | 0.4 | — |
| | 11 | A-2 | 10.0 | — | 2.0 | C-1 | 50.0 | — | 50.0 | 1.0 | — | — |
| | 12 | A-2 | 10.0 | — | 2.0 | C-5 | 50.0 | — | 50 0 | 1.0 | 0.4 | 0.2 |
| Comparative Examples | 1 | A-0 | 10.0 | — | — | A-1 | 100.0 | — | — | 1.0 | — | — |
| | 2 | B-0 | — | 10.0 | — | B-1 | — | 100.0 | — | 1.0 | — | — |
| | 3 | A-0 | 10.0 | — | — | C-1 | 50.0 | — | 50.0 | 1.0 | — | — |
| | 4 | A-0 | 10.0 | — | — | C-5 | 50.0 | — | 50.0 | 1.0 | 0.4 | 0.2 |
| | 5 | A-0 | 10.0 | — | — | C-6 | 50.0 | — | 50.0 | 2.0 | — | — |

2. The laminate adhesive according to claim 1, wherein the silane coupling agent is further contained in the base component.

3. The laminate adhesive according to claim 1, wherein aminosilane is further contained in the base component.

4. The laminate adhesive according to claim 3, wherein oxyacid of phosphorus or derivative thereof is contained in the base component.

5. The laminate adhesive according to claim 1, which is used for purposes and applications subjected to hot water treatments at a temperature of not less than 100° C.

6. A method for preparing a laminate adhesive, which comprises mixing a curing component containing polyisocyante and epoxysilane as a silane coupling agent with a base component containing polyol.

7. A method for preparing a laminated article, which comprises applying a laminate adhesive to a first layer of the laminated article, and applying a second layer of the laminated article to the laminate adhesive on the first layer, wherein the laminate adhesive comprises a curing component containing polyisocyante and epoxysilane as a silane coupling agent together with a base component containing polyol.

* * * * *